United States Patent
Alison et al.

(10) Patent No.: US 12,307,496 B2
(45) Date of Patent: *May 20, 2025

(54) AUTOMATED EXTRACTION OF DATA FROM WEB PAGES

(71) Applicant: Capital One Services, LLC, McLean, VA (US)

(72) Inventors: Samuel Alison, Austin, TX (US); Ryan Engle, Austin, TX (US); Jacob Riesterer, Austin, TX (US); Jonathan Coon, Austin, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/312,820

(22) Filed: May 5, 2023

(65) Prior Publication Data

US 2023/0273920 A1   Aug. 31, 2023

Related U.S. Application Data

(63) Continuation of application No. 17/364,432, filed on Jun. 30, 2021, now Pat. No. 11,681,699, which is a
(Continued)

(51) Int. Cl.
*G06F 16/245* (2019.01)
*G06F 16/95* (2019.01)
(Continued)

(52) U.S. Cl.
CPC ....... *G06Q 30/0629* (2013.01); *G06F 16/245* (2019.01); *G06F 16/95* (2019.01);
(Continued)

(58) Field of Classification Search
CPC ...... G06F 16/245; G06F 16/95; G06F 16/986; G06Q 30/0629; H04L 67/01; H04L 67/02; H04L 67/10; H04L 67/60
See application file for complete search history.

(56) References Cited

U.S. PATENT DOCUMENTS

| | | |
|---|---|---|
| 8,065,195 B2 | 11/2011 | Tarvydas et al. |
| 8,577,749 B2 | 11/2013 | Aliabadi et al. |

(Continued)

FOREIGN PATENT DOCUMENTS

| | | |
|---|---|---|
| WO | 2008121737 A1 | 10/2008 |
| WO | 2009061399 A1 | 5/2009 |
| WO | 2017062680 A1 | 4/2017 |

OTHER PUBLICATIONS

Schultz, NBA Data Scraping—Game Data, https://bigishdate.com/2015/05/31/nba-data-scraping-game-data/(Year: 2015).

(Continued)

*Primary Examiner* — William Spieler
(74) *Attorney, Agent, or Firm* — Bookoff McAndrews, PLLC

(57) ABSTRACT

Various embodiments provide techniques for automatically extracting data from web pages. Such extraction can take place without the use of a browser, and without necessarily rendering the entire web page. Thus, data extraction can be performed more efficiently and more quickly, while reducing the computing resources needed to perform such operations. In at least one embodiment, data extraction and translation are performed by automatically parsing structured data from visible and hidden elements of a web page.

20 Claims, 4 Drawing Sheets

Related U.S. Application Data continuation of application No. 16/567,367, filed on Sep. 11, 2019, now Pat. No. 11,055,281, which is a continuation of application No. 15/287,089, filed on Oct. 6, 2016, now Pat. No. 10,452,653.

(60) Provisional application No. 62/376,243, filed on Aug. 17, 2016, provisional application No. 62/238,574, filed on Oct. 7, 2015, provisional application No. 62/238,565, filed on Oct. 7, 2015.

(51) Int. Cl.

| | | |
|---|---|---|
| *G06F 16/958* | (2019.01) | |
| *G06Q 30/0601* | (2023.01) | |
| *H04L 67/01* | (2022.01) | |
| *H04L 67/02* | (2022.01) | |
| *H04L 67/10* | (2022.01) | |
| *H04L 67/564* | (2022.01) | |
| *H04L 67/567* | (2022.01) | |
| *H04L 67/60* | (2022.01) | |

(52) U.S. Cl.
CPC ............ *G06F 16/986* (2019.01); *H04L 67/01* (2022.05); *H04L 67/02* (2013.01); *H04L 67/10* (2013.01); *H04L 67/564* (2022.05); *H04L 67/567* (2022.05); *H04L 67/60* (2022.05)

(56) References Cited

U.S. PATENT DOCUMENTS

| | | |
|---|---|---|
| 8,600,931 B1 | 12/2013 | Wehrle et al. |
| 8,775,275 B1 | 7/2014 | Pope |
| 8,881,303 B2 | 11/2014 | Liu et al. |
| RE45,371 E | 2/2015 | Simons |
| 9,189,811 B1 | 11/2015 | Bhosle et al. |
| 9,626,688 B2 | 4/2017 | King |
| 9,639,853 B2 | 5/2017 | Shiffert et al. |
| 9,766,922 B2 | 9/2017 | Amershi et al. |
| 9,798,528 B2 | 10/2017 | Gao et al. |
| 9,892,099 B2 | 2/2018 | Cao |
| 9,922,327 B2 | 3/2018 | Johnson et al. |
| 9,953,335 B2 | 4/2018 | Shiffert et al. |
| 9,965,769 B1 | 5/2018 | Shiffert et al. |
| 2002/0087883 A1 | 7/2002 | Wohlgemuth et al. |
| 2005/0165789 A1 | 7/2005 | Minton et al. |
| 2006/0242266 A1 | 10/2006 | Keezer et al. |
| 2007/0180380 A1 | 8/2007 | Khavari et al. |
| 2008/0005079 A1 | 1/2008 | Flake et al. |
| 2008/0098300 A1 | 4/2008 | Corrales et al. |
| 2008/0189190 A1 | 8/2008 | Ferber |
| 2009/0182643 A1 | 7/2009 | Holstein et al. |
| 2009/0313352 A1 | 12/2009 | Dupont |
| 2010/0121810 A1 | 5/2010 | Bromenshenkel et al. |
| 2010/0241518 A1 | 9/2010 | McCann |
| 2011/0088036 A1 | 4/2011 | Patanella |
| 2011/0136516 A1 | 6/2011 | Ellis |
| 2012/0011431 A1 | 1/2012 | Mao |
| 2012/0198342 A1 | 8/2012 | Mahmud |
| 2012/0265637 A1 | 10/2012 | Moeggenberg |
| 2013/0151381 A1 | 6/2013 | Klein |
| 2013/0191723 A1 | 7/2013 | Pappas et al. |
| 2014/0100991 A1 | 4/2014 | Lenahan et al. |
| 2014/0229258 A1 | 8/2014 | Seriani |
| 2014/0229335 A1 | 8/2014 | Chen |
| 2014/0244429 A1 | 8/2014 | Clayton et al. |
| 2014/0281918 A1 | 9/2014 | Wei et al. |
| 2014/0325337 A1 | 10/2014 | Mcweeney |
| 2015/0287047 A1 | 10/2015 | Situ et al. |
| 2016/0063595 A1 | 3/2016 | Oral et al. |
| 2016/0191351 A1 | 6/2016 | Smith et al. |
| 2017/0104841 A1 | 4/2017 | Duke et al. |
| 2017/0171311 A1 | 6/2017 | Tennie et al. |
| 2017/0277764 A1 | 9/2017 | Osotio |
| 2018/0089737 A1 | 3/2018 | Ali et al. |

OTHER PUBLICATIONS

Reda, Web Scraping 201: finding the API, http://www.gregreda.com/2015/02/15/we-scraping-finding-the-api/ (Year: 2015).

Moore, Nylon Calculus 101: Data Scraping With Python, http://web.archive.org/web/20150910031106/http://nyloncalculus.com/2015/09/07/nylon-calculus-101-data-scraping-with-python/ (Year: 2015).

AUTOMATED EXTRACTION OF DATA FROM WEB PAGES

CROSS-REFERENCE TO RELATED APPLICATIONS

The present application is a continuation of U.S. patent application No. 17/364,432, filed Jun. 30, 2021, which is a continuation of U.S. patent application No. 16/567.367, filed Sep. 11, 2019, which is a continuation of U.S. patent application Ser. No. 15/287,089, filed Oct. 6, 2016, which claims the benefit of U.S. Provisional Application No. 62/238,565, entitled "Browserless Extraction of Data from Web Pages," filed Oct. 7, 2015.

U.S. patent application Ser. No. 15/287,089, filed Oct. 6, 2016, to which this application also claims priority, further claims the benefit of U.S. Provisional Application No. 62/238,574, entitled "Automated Browserless Sequential Site Navigation," filed Oct. 7, 2015.

U.S. patent application Ser. No. 15/287,089, filed Oct. 6, 2016, to which this application also claims priority, further claims the benefit of U.S. Provisional Application No. 62/376,243, entitled "Automated Testing of Multiple On-Line Coupons," filed Aug. 17, 2016.

U.S. patent application Ser. No. 15/287,089, filed Oct. 6, 2016, to which this application also claims priority, is related to U.S. patent application No. 14/933,173, entitled "Universal E-Universal Electronic Shopping Cart." filed Nov. 5, 2015.

U.S. patent application Ser. No. 15/287,089, filed Oct. 6, 2016, to which this application also claims priority, is related to U.S. Patent Application 15/287,668 entitled "Automated Sequential Site Navigation," filed Oct. 6, 2016.

All the above-mentioned applications are incorporated by reference herein in their entirety.

TECHNICAL FIELD

The present document relates to techniques for automated extraction of data from web pages.

DESCRIPTION OF THE RELATED ART

Some websites, such as Google Shopping, allow customers to comparison shop, by providing pricing and other information from multiple merchants. The customer can then click on a link to be taken to a particular merchant's website so as to purchase the item there. Other websites, such as Amazon, act as a storefront and/or marketplace wherein customers can buy items from different merchants; in some cases, the website operator fulfills the order on behalf of the merchant.

Related U.S. Utility application Ser. No. 14/933,173 for "Universal E- Universal Electronic Shopping Cart", filed Nov. 5, 2015, describes a buying engine that provides a universal e-shopping cart regardless of where the customer shops. The customer may shop at whichever online merchant(s) he or she likes to shop, using any suitable client device and software, for example by using a browser or app to shop for items at various websites. When the customer is interested in an item at a website of a merchant, he or she clicks on an "Add to Cart" (ATC) button as normal. The system intercepts the ATC request and automatically determines which merchant (of all known merchants) is deemed to be the best choice for purchase of the identified item. The item can then be purchased from that merchant, either automatically (via the universal e-shopping cart) or by redirection to the merchant's web page, or by some other means.

In such contexts, as well as in other contexts, it is useful to obtain information about pricing and availability for items at various e-commerce sites. Existing techniques for obtaining information from websites can include the use of an API to automatically interact with the website, and/or "scraping" techniques to obtain information from rendered web pages. Both of these techniques are deficient, in that they require the cooperation of the website from which the data is to be obtained, and/or they require rendering of web pages which can be computationally expensive and can consume bandwidth. In addition, such techniques are inefficient when information describing multiple configurations of a product (such as different sizes or colors) is to be obtained, as such operations typically require multiple requests or scrapes. In some cases it is necessary to evaluate JavaScript on the page to reveal information about variants, which can lead to a combinatorial problem when dealing with multiple variants, such as size and width.

SUMMARY

Various embodiments provide techniques for automatically extracting data from web pages. In at least one embodiment, such extraction can take place without the use of a browser, and without necessarily rendering the entire web page. Thus, data extraction can be performed more efficiently and more quickly, while reducing the computing resources needed to perform such operations.

The techniques described herein can be implemented, for example, to extract information from an e-commerce website. In one example, product data can be extracted, including product variants such as color, size, width and availability, without having to load and render the entire web page in a browser. One skilled in the art will recognize that, although the system and method are described herein in such an e-commerce environment, the techniques can be applied to any other context.

In at least one embodiment, data extraction and translation are performed by automatically parsing structured data from visible and hidden elements of a web page. In at least one embodiment, such operations can be performed by a software and/or hardware component at a client or server. Any suitable device can be used, such as a computer, smartphone, kiosk, laptop, personal digital assistant, or other device.

A browser need not be installed or used. However, one skilled in the art will recognize that in at least one embodiment the techniques described herein can be implemented in a browser. For example, a browser can be configured to perform automated extraction as described herein, without necessarily rendering pages in visible form for output.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the system can be implemented on any electronic device or devices equipped to receive, store, and present information. Such electronic devices may be, for example, desktop computers, laptop computers, smartphones, tablet computers, smart watches, wearable devices, or the like.

Although the system is primarily described herein in connection with an implementation in a client/server context wherein the client is a computer, smartphone, tablet, or similar device, one skilled in the art will recognize that the techniques described herein can be implemented in other contexts, and indeed in any suitable device capable of receiving and/or processing user input, and/or communicating with other components over an electronic network. Accordingly, the following description is intended to illustrate various embodiments by way of example, rather than to limit scope.

Figure 1:
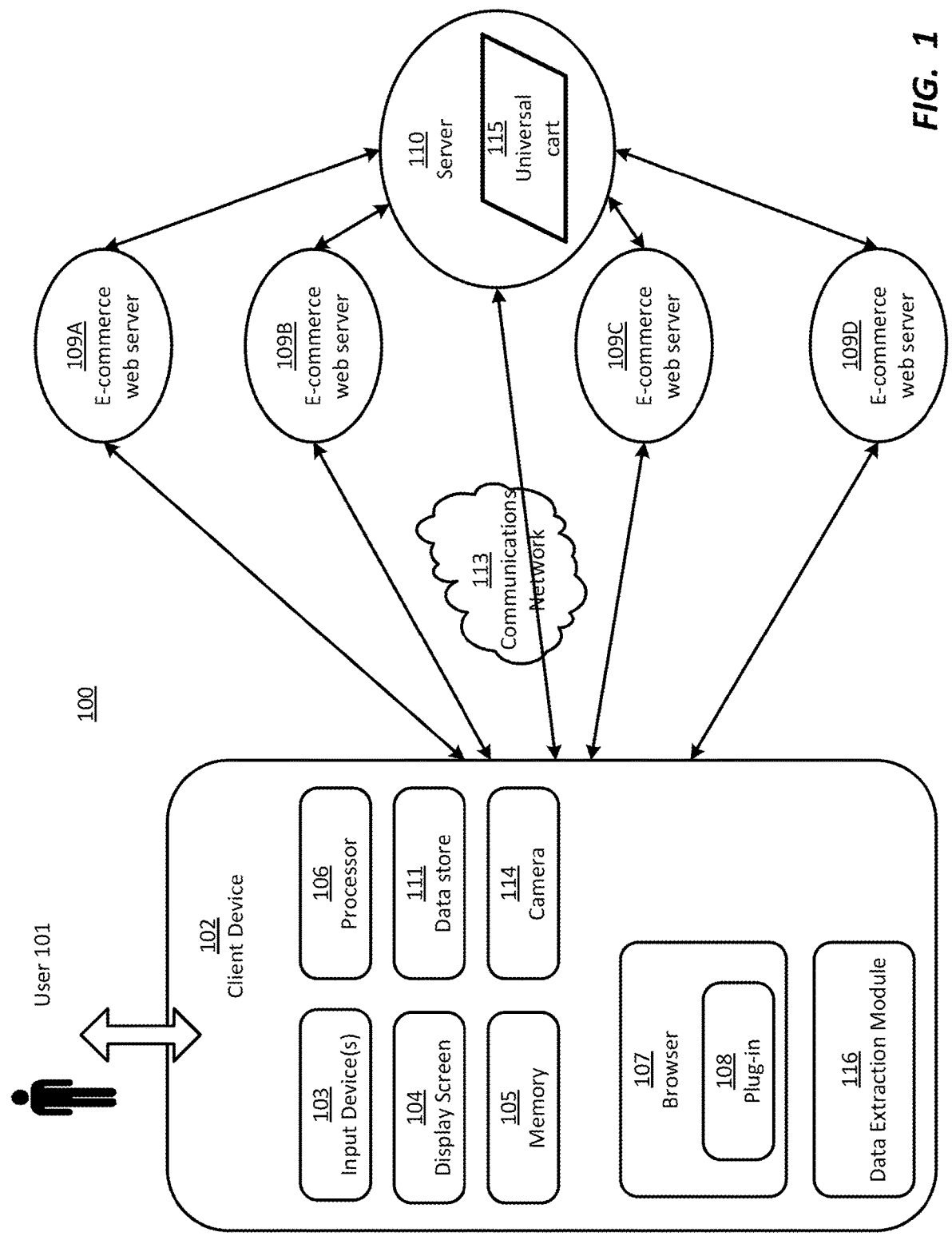
FIG. 1 is a block diagram depicting a system for performing automated extraction of data from web pages according to one embodiment.

Referring now to FIG. 1, there is shown a block diagram depicting a system 100 for implementing the techniques described herein according to one embodiment. As shown in FIG. 1, in at least one embodiment, the system is implemented in a client/server environment wherein client device 102 can send and receive communications with any number of e-commerce website servers 109 via communications network 113. In at least one embodiment, server 110 can also be provided to implement universal cart 115, although such functionality is not required in order to implement the techniques described herein. Server 110, if provided, receives and responds to requests from client device 102.

Client device 102 may be any electronic device equipped to receive, store, and/or present information, and to receive user input in connect with such information, such as a desktop computer, laptop computer, personal digital assistant (PDA), cellular telephone, smartphone, music player, handheld computer, tablet computer, kiosk, game system, smart watch, wearable device, or the like. In at least one embodiment, client device 102 has a number of hardware components well known to those skilled in the art. Input device(s) 103 can be any element or elements capable of receiving input from user 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Processor 106 can be a conventional microprocessor for performing operations on data under the direction of software, according to well-known techniques. Memory 105 can be random-access memory, having a structure and architecture as are known in the art, for use by processor 106 in the course of running software.

Browser 107 is an example of a software application that can be used by user 101 to access and interact with websites over communications network 113. In at least one embodiment, user 101 can view and interact with e-commerce web servers 109 via browser 107, for example by clicking on links to view items and to place items in a shopping cart. In other embodiments, any suitable app (software application) or other component can be used in place of browser 107.

In at least one embodiment, browser 107 includes plug-in 108 (or browser extension) which performs certain functions in connection with the system and method described herein. For example, as described in more detail below, in at least one embodiment, plug-in 108 can request web pages from web servers 109 and extract data from such web pages without necessarily rendering the pages. Alternatively, such operations can be performed by another component that need not be a part of browser 107, such as data extraction module 116. In at least one embodiment, plug-in 108 and/or data extraction module 116 run in the background no matter what browser or application user 101 is running. In at least one embodiment, plug-in 108 and/or data extraction module 116 operate without any need for human interaction. In this manner, background applications can extract data in connection with any relevant interactions with websites run by web servers 109, regardless of which software is being used to perform the interactions.

As depicted and described herein, data extraction module 116 can be implemented as software running on processor 106. However, data extraction module 116 need not be implemented as a separate module, and can instead be part of a software application that performs some other function. Alternatively, data extraction module 116 can run on a device other than client device 102. Alternatively, data extraction module 116 can be implemented as hardware, or can be omitted, with its functionality assigned to other component(s).

Display screen 104 can be any element that graphically displays information such as items presented by browser 107, user interface elements, and/or the like. Such output may include, for example, descriptions and images depicting items that user 101 places in a shopping cart, navigational elements, search results, pricing and shipping information, graphical elements, forms, or the like. In at least one embodiment where only some of the desired output is presented at a time, a dynamic control, such as a scrolling mechanism, may be available via input device 103 to change which information is currently displayed, and/or to alter the manner in which the information is displayed.

In at least one embodiment, the information displayed on display screen 104 may include data in text and/or graphical form.

Data store 111 can be any magnetic, optical, or electronic storage device for data in digital form; examples include flash memory, magnetic hard drive, CD-ROM, DVD-ROM, thumbdrive, or the like. Data store 111 may be fixed or removable.

In at least one embodiment, device 102 can include additional components. For example, a camera 114 can be included, as is well known for devices such as smartphones. Camera 114 is optional and can be omitted.

Additional input mechanisms, sensors, and/or devices can also be included in device 102, such as a speaker (for voice commands), accelerometer (to detect shaking and changes in position or orientation), GPS sensor (to detect location), and/or the like.

As mentioned above, FIG. 1 depicts an example of a system implementation in a client/server environment. An example of such a client/server environment is a web-based implementation, wherein client device 102 runs automated site navigation module 116 that automatically interacts with web pages and/or other web-based resources from e-commerce web servers 109. Information, images, and/or text from websites of e-commerce web servers 109 can be transmitted to module 116 as part of such web pages and/or other web-based resources, using known protocols and languages such as Hypertext Markup Language (HTML), Java, JavaScript, and the like. In addition, such information images, and/or text from websites of e-commerce web servers 109 can be presented in browser 107, or in some other software application (app) or other component running on client device 102, as part of user interactions with websites of e-commerce web servers 109. As described in more detail below, plug-ins 108 can record such interactions.

Any suitable type of communications network 113, such as the Internet, can be used as the mechanism for transmitting data among client device 102, server 110, and web servers 109, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications network 113 can be wired or wireless, or any combination thereof. Communications across network 113 can be encrypted or unencrypted. In at least one embodiment, client device 102 transmits requests for data via communications network 113, and receives responses from server 110 and/or e-commerce web servers 109 containing the requested data.

In at least one embodiment, some components of system 100 can be implemented as software written in any suitable computer programming language. Alternatively, such components may be implemented and/or embedded in hardware.

As described in more detail below, in at least one embodiment, data extraction module 116 automatically parses structured data from visible and hidden elements of a web page, for example by simulating operation of a browser but without necessarily rendering the web pages themselves. Extracted data can be stored in data store 111 or elsewhere.

As depicted in FIG. 1, in at least one embodiment, the system can be implemented in connection with a server 110. Server 110 can operate a universal cart 115; items are added to universal cart 115 according to techniques described in related U.S. Utility application Ser. No. 14/933,173 for "Universal E- Universal Electronic Shopping Cart", filed Nov. 5, 2015, the disclosure of which is incorporated by reference herein. However, universal cart 115 is optional and need not be included to implement the techniques discussed herein. In addition, universal cart 115 is not necessarily a physical component of server 110, but is, in at least one embodiment, a data structure or dataset that can be stored in a database or other suitable storage architecture on an electronic storage device. Universal cart 115 need not be maintained at server 110 itself, but can be maintained at another component to which server 110 has access, such as a separate server or data storage device. Additional details concerning the structure and organization of server 110, and the operation of universal cart 115, are described in the above-referenced related application.

In another embodiment, as discussed in the above-referenced related application, the functionality for recording interactions with web server 109 and for performing automated data extraction can be built into browser 107 itself, or into plug-in 108, or into an operating system running at client device 102. Alternatively, such functionality can be implemented as a separate software applications (app) running on device 102.

In another embodiment, server 110 can be omitted entirely, and the described system can be implemented as a technique to perform automated data extraction without the use of a server 110. Indeed, in at least one embodiment, the described system can be implemented entirely within one or more client device(s) 102.

Method

Figure 2:
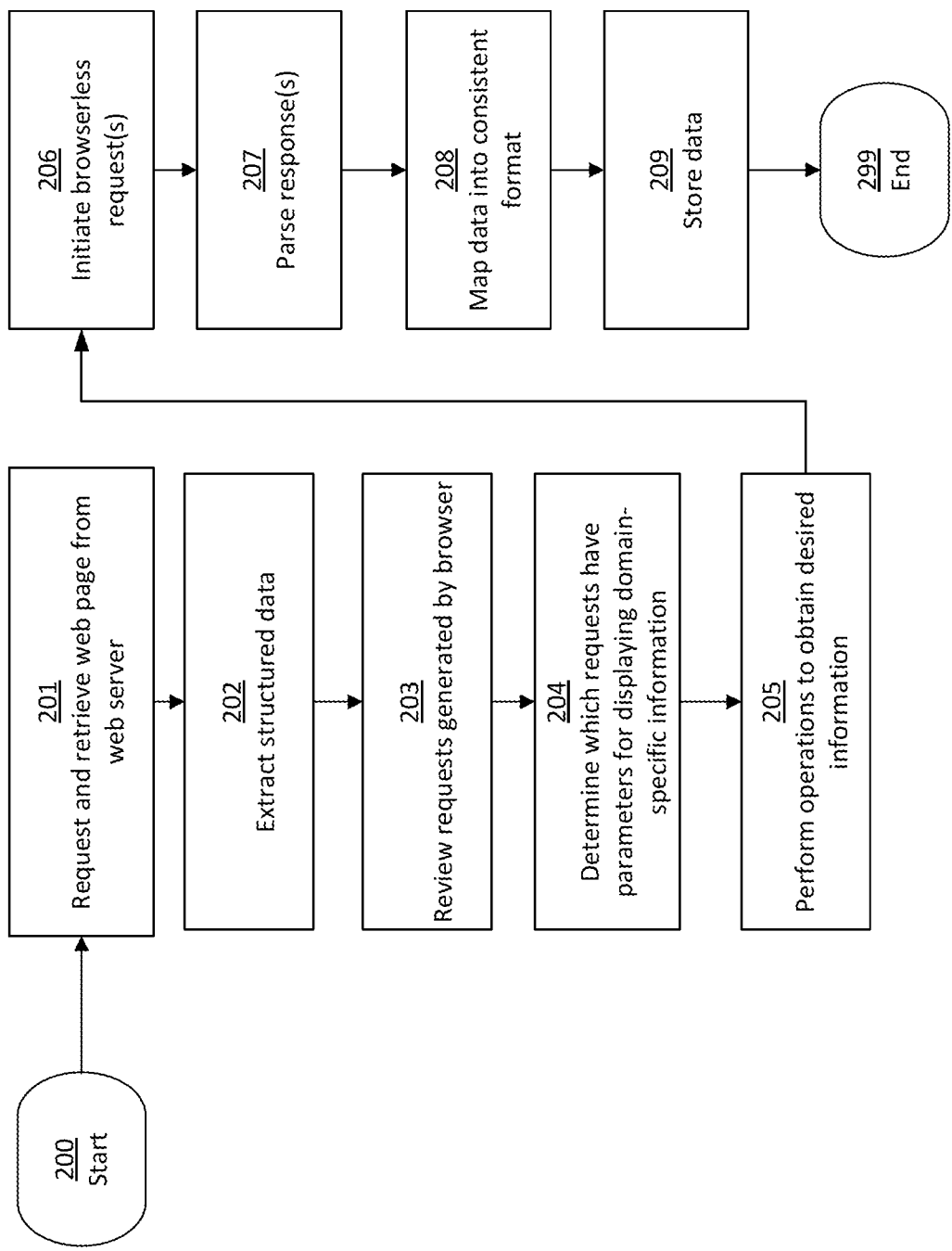
FIG. 2 is a flowchart depicting an overall method for performing automated extraction of data from web pages according to one embodiment.
Figure 3:
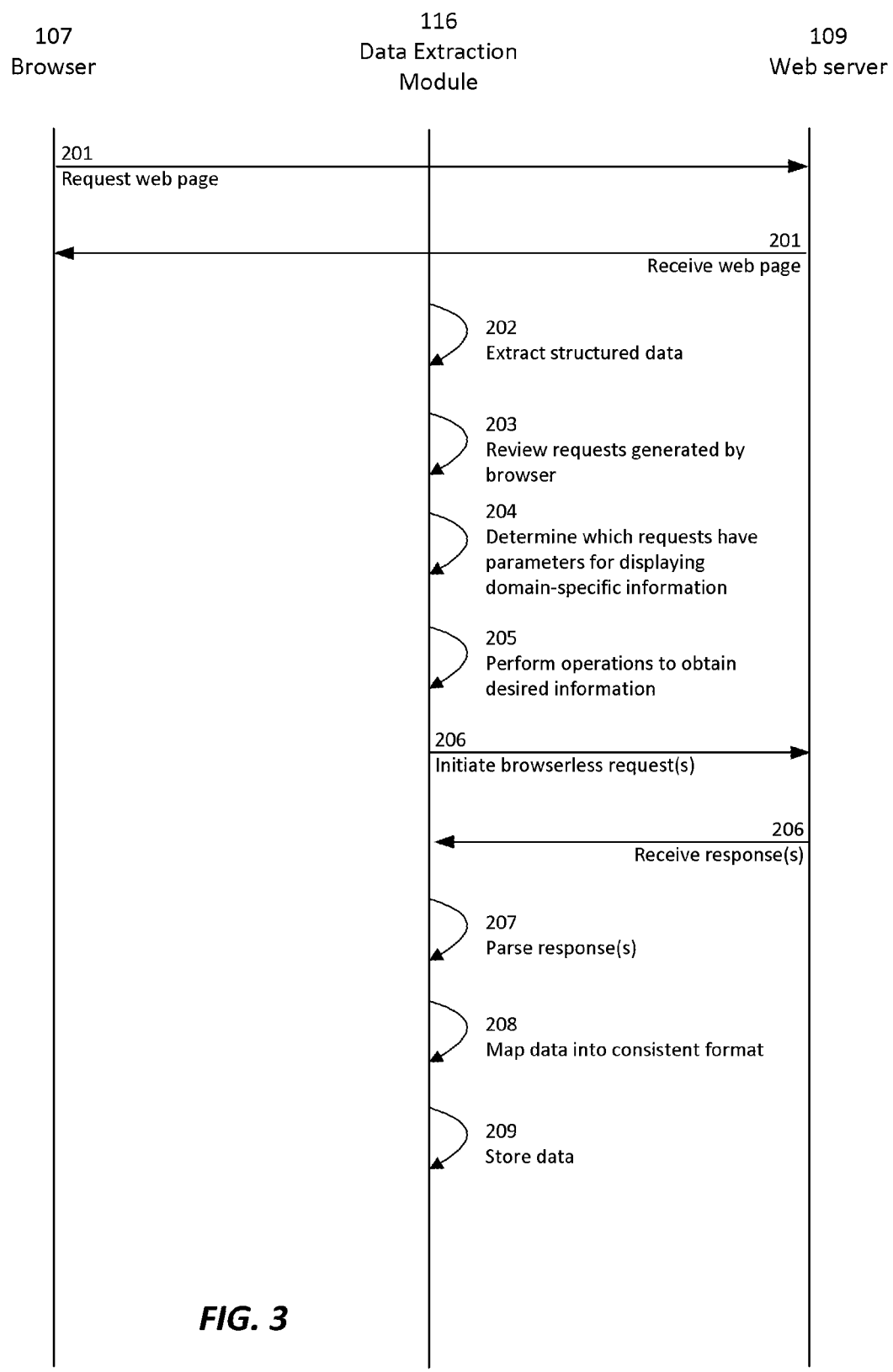
FIG. 3 is an event trace diagram depicting an overall method for performing automated extraction of data from web pages according to one embodiment.
Figure 4:
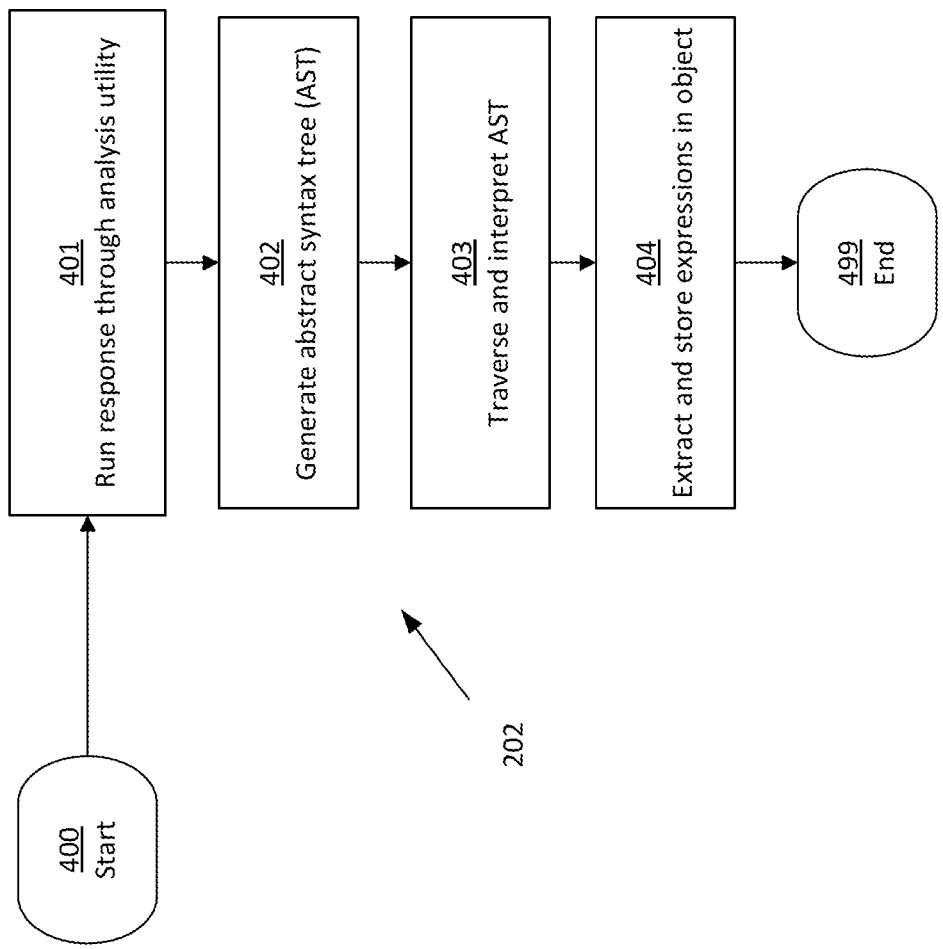
FIG. 4 is a flowchart depicting further details of the automated extraction step, according to one embodiment.

Referring now to FIG. 2, there is shown a flowchart depicting a method for implementing automated extraction of data from web pages according to one embodiment. Referring also to FIG. 3, there is shown an event trace diagram depicting the method according to one embodiment. Although described herein in terms of tangible goods, the system and method can be implemented for any type of online purchases, including for example services, travel, event tickets, media and entertainment content, and/or the like.

In at least one embodiment, the method depicted in FIGS. 2 and 3 can be performed using the architecture depicted in FIG. 1, with many of the steps being performed by data extraction module 116. However, one skilled in the art will recognize that the method can be performed using other architectures and arrangements, using any suitable software and/or hardware components running scripts. In at least one embodiment, the method of FIGS. 2 and 3 can be implemented on any client device(s) 102 or other device(s) capable of interacting with web server(s) 109. Thus, execution of scripts to perform the operations described herein can be done at client device 102, server 110, and/or any other component, using any suitable language capable of making HTTP requests and parsing responses.

Client device 102 requests and retrieves 201 a web page from a web server, such as one of e-commerce web servers 109. In at least one embodiment, step 201 can be performed by browser 108, or by any other software component. Data extraction module 116 automatically extracts 202 structured data from visible and hidden elements of a web page. In at least one embodiment, data extraction module 116 performs step 202 by simulating operation of browser 107, so that, to web server 109, the request appears to come from an ordinary browser 107. Alternatively, step 202 can be performed by browser 107 itself, or by plug-in 108 of browser. Additional details are provided below.

Data extraction module 116 reviews 203 the requests being generated by browser 107 to render the page. Based on this review, module 116 determines 204 which requests contain parameters for displaying domain-specific information by automatically searching through all requests for domain-specific attributes, such as the product title or SKU. Examples of such information are product data including product variants such as color, size, width and availability, although other information may be extracted for other contexts and environments, as appropriate and desired.

In at least one embodiment, module 116 performs one or more data extraction and transform operations 205 to obtain desired domain-specific information. Such operations can include for example: parsing structured information in script tags; extracting content from received HTML through DOM parsing; requesting content that is returned in a readable structure, such as JSON or XML; and/or any combination thereof.

Once the necessary requests are identified, those requests can be initiated 206 without the use of browser 107. Thus, a module 116 can be configured to make such requests (such as GET and/or POST requests) without performing rendering operations as would browser 107. In at least one embodiment, module 116 then parses 207 the responses to extract the relevant bits of data. In at least one embodiment, after the data has been parsed, module 116 maps 208 the data into a consistent format that generalizes across hosts to create a unified and consistent API. The data is then stored 209, for example in client-based data store 111 or in centralized storage (not shown) accessible by client device 102. Alternatively, the data can be output on an output device, or transmitted via an electronic communications network, for example to another client device 102 or to a server.

In at least one embodiment, if the response does not have all the desired information, module 116 can be configured to make additional requests to obtain additional information.

Data Extraction 202

Referring now to FIG. 3, there is shown a flowchart depicting further details of automated extraction step 202, according to one embodiment. After a response to a request is received, the response is run 401 through a utility that extracts all of the data within HTML script tags. The system then attempts to generate 402 an abstract syntax tree (AST) with that content using an AST parser. The AST can be traversed and interpreted 403 using any suitable scripting language, such as JavaScript standard traversal practices. Object expressions, array expressions, assignment expressions, and the like are then extracted and stored 404 in an object. This allows for the structured data to be easily and consistently accessed from within the script.

In at least one embodiment, the system can automatically extract microdata, which is data stored in an itemprop attribute on some websites. This can be achieved, for example, by analyzing the DOM and searching for microdata, such as that defined by schema.org or some other suitable resource.

In at least one embodiment, data can be extracted using a machine learning approach. By training a model over existing extracted data, the model can learn to automatically extract similar data on newly encountered pages. A model can be trained over DOM features, such as class names, id names, tag information and other data attributes present in the DOM, as well as any other available features. Such an approach can be applied to structured information as well, such as JSON or XML, where the model can be trained to understand what a product title or price looks like, to make use of such information in a meaningful way.

API-Like Access to Data

In many cases, a web server 109 returns data in its own structured format that is consistent among pages associated with the same host. In at least one embodiment, the system and method described herein can make use of such a structured format to enable API-like access to the site's data without any work or support from the web server 109 or website owner. For example, once a parser and translator have been written for a particular website, the data from the pages of the website can be extracted and translated into a consistent proprietary format on newly encountered pages of the same host, thus granting API-like access to the website's data.

EXAMPLE

In at least one embodiment, the techniques described herein can be used to extract information in connection with an e-commerce website. For example, if an e-commerce website carries different variants of a particular product (such as shoes), the described system and method can be used to obtain and extract pricing, descriptions, in-stock information, and/or the like for all the different variants without having to render each product description page separately.

In at least one embodiment, the system can be used in connection with techniques described in the above-referenced related applications, so as to enable improved functionality for a universal electronic shopping cart. For example, suppose a user is shopping at Website A, and adds an item to her cart. As described in the above-referenced related applications, the system can intercept the add-to-cart request (using, for example a plug-in at the user's client machine). Based on the intercepted information, the system can find other sources for the item that may be cheaper, faster, or otherwise preferable to Website A. Using the techniques described herein, the process of finding those other sources can be made more efficient; specifically, rather than running a browser at other websites to find equivalent product pages, the system can use the techniques described herein to generate requests to the other websites and parse the results. These results can then be used to present, to the user, information about availability of the desired product from these other websites.

In at least one embodiment, in addition to obtaining pricing and shipping information, the system can use the described techniques to passively obtain inventory information from servers, for example to determine which competing websites have the desired product in stock, and in which size, color, variant, and/or the like. Certain sites keep track of their competitors, and that information may be accessible because it is displayed to the client; accordingly, in at least one embodiment, the system can extract such information as well, using the techniques described herein.

In this manner, the techniques described herein can be used to implement universal electronic shopping cart functionality in a faster and more efficient manner, involving low cost to both client device 102 and server 110.

Applications

As mentioned above, the described techniques can be used in many different contexts, including e-commerce as well as other domains. For example, the techniques can be used in any situation where it is desirable to obtain information from multiple websites and restructure such information into a consistent format for presentation or other use. The described system and method thus provide an efficient, generalized approach for extracting information from a broad variety of sources in an efficient manner.

In various embodiments, the system and method can be used for obtaining information related to travel, lodging, automobile shopping, and/or the like, from any number of disparate sources, without the need for any specialized API to communicate with the various sources. For example, a user may enter a desired origin, destination, and date for air travel, and the described techniques can be used to obtain flight information from any number of different sources, without having to use a browser; such information can then be presented in a unified, consistent manner to the user. Similar techniques can be used for hotels, car rentals, and/or the like.

In another example, the system can be used to extract information from a plurality of social media websites. For example, a user may search for an individual, and the system can extract information from Facebook, LinkedIn, and/or other sources, without necessarily using a browser and without the need for any specialized API to communicate with the various social media websites. Information about the individual can then be presented in a unified, consistent format, even if such information was obtained from disparate sources. A schema allows for consistency across sources, and many sources are able to fill in various fields related to the person in question. Using an identifier that is consistent across sources allows multiple sources to manipulate the data.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in at least one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A system, comprising:
at least one memory storing instructions; and
at least one processor, operatively connected to the at least one memory, and configured to perform a process including:
   generating an API that is generalized across a plurality of websites by, for each website:
      obtaining at least one reply transmitted by a web server associated with the website in response to a request transmitted to the web server;
      based on the at least one reply, extracting data from the website;
      applying an abstract syntax parser to the extracted data to generate an abstract syntax tree;
      based on the abstract syntax tree, generating a translation between a format of the data from the website and a standardized API format; and
      based on the translation, generating at least one API request that is specific to the website and that is executable to retrieve requested data from the website in the standardized API format; and
   utilizing the generated API to obtain respective information from each of the plurality of websites by, in each case, transmitting the at least one generated API request specific to the website to the web server associated with the website, the information, in each case, pertaining to at least one aspect of a same product or service available on the plurality of websites.

2. The system of claim 1, wherein extracting the data from the website includes:
   obtaining a domain object model for the website;
   applying a model trained by machine learning to identify targeted information from the domain object model; and
   extracting the identified targeted information from the website.

3. The system of claim 2, wherein the targeted information includes information having a predetermined structure.

4. The system of claim 1, wherein extracting the data from the website includes, in each case:
   analyzing script tag data within script tags included in the at least one reply, wherein the abstract syntax tree is generated based on the script tag data; and
   traversing and interpreting the abstract syntax tree.

5. The system of claim 1, wherein extracting the data from the website includes, in each case:
   obtaining a domain object model for the website;
   analyzing the domain object model to identify microdata of the website; and
   extracting the microdata from the website.

6. The system of claim 1, wherein the data from the website, in each case, is structured data.

7. The system of claim 1, wherein:
   the product or service is displayed on a website visited by a user device; and
   the utilizing of the API is in response to the display on the website.

8. A computer-implemented method, comprising:
   generating an API that is generalized across a plurality of websites by, for each website:
      obtaining at least one reply transmitted by a web server associated with the website in response to a request transmitted to the web server;
      based on the at least one reply, extracting data from the website; and
      based on the extracted data, generating at least one API request that is specific to the website and that is executable to retrieve requested data from the website in a standardized API format; and
   utilizing the generated API to obtain respective information from each of the plurality of websites by, in each case, transmitting the at least one generated API request specific to the website to the web server associated with the website, the information, in each case, pertaining to at least one aspect of a same product or service available on the plurality of websites.

9. The computer-implemented method of claim 8, wherein extracting the data from the website includes:
   analyzing script tag data within script tags included in the at least one reply.

10. The computer-implemented method of claim 8, wherein extracting the data from the website includes:
    obtaining a domain object model for the website;
    analyzing the domain object model to identify microdata of the website; and
    extracting the microdata from the website.

11. The computer-implemented method of claim 8, wherein extracting the data from the website includes:
    applying a model trained by machine learning to identify data from the website having a predetermined structure; and
    extracting information having the predetermined structure from the website.

12. The computer-implemented method of claim 8, wherein the data from the website, in each case, is structured data.

13. The computer-implemented method of claim 8, wherein:
    the product or service is displayed on a website visited by a user device; and
    the utilizing of the API is in response to the display on the website.

14. A computer-implemented method, comprising:
generating an API that is generalized across a plurality of websites by, for each website:
obtaining at least one reply transmitted by a web server associated with the website in response to a request transmitted to the web server;
based on the at least one reply, extracting data from the website;
applying an abstract syntax parser to the extracted data to generate an abstract syntax tree;
traversing and interpreting the generated abstract syntax tree to determine a translation between a format of the data from the website and a standardized API format; and
based on the translation, generating at least one API request that is specific to the website and that is executable to retrieve requested data from the website in the standardized API format.

15. The computer-implemented method of claim 14, wherein extracting the data from the website includes:
analyzing script tag data within script tags included in the at least one reply, wherein the abstract syntax tree is generated based on the script tag data; and
traversing and interpreting the abstract syntax tree.

16. The computer-implemented method of claim 14, wherein extracting the data from the website includes:
obtaining a domain object model for the website;
analyzing the domain object model to identify microdata of the website; and
extracting the microdata from the website.

17. The computer-implemented method of claim 14, further comprising:
utilizing the generated API to obtain respective information from each of the plurality of websites by, in each case, transmitting the at least one generated API request specific to the website to the web server associated with the website, the information, in each case, pertaining to at least one aspect of a same product or service available on the plurality of websites.

18. The computer-implemented method of claim 17, wherein:
the product or service is displayed on a website visited by a user device; and
the utilizing of the API is in response to the display on the website.

19. The computer-implemented method of claim 14, wherein the data from the website, in each case, is structured data.

20. The computer-implemented method of claim 14, wherein extracting the data from the website includes:
applying a model trained by machine learning to identify data from the website having a predetermined structure; and
extracting information having the predetermined structure from the website.

* * * * *